United States Patent [19]

Sanchez

[11] Patent Number: 4,653,832

[45] Date of Patent: * Mar. 31, 1987

[54] CABLE CONNECTOR COVER WITH INTEGRAL STRAIN RELIEF

[76] Inventor: Michael A. Sanchez, R.D. 1; 194 C Charlestown Rd., Malvern, Pa. 19355

[*] Notice: The portion of the term of this patent subsequent to Dec. 31, 2002 has been disclaimed.

[21] Appl. No.: 808,939

[22] Filed: Dec. 16, 1985

Related U.S. Application Data

[63] Continuation of Ser. No. 584,613, Feb. 29, 1984, Pat. No. 4,561,715.

[51] Int. Cl.$^4$ ............................................. H01R 13/58
[52] U.S. Cl. .............................. 339/103 R; 339/210 R
[58] Field of Search .............. 339/103 R, 103 M, 107, 339/206 R, 210 R, 210 M

[56] References Cited

U.S. PATENT DOCUMENTS

| | | | |
|---|---|---|---|
| 4,108,527 | 8/1978 | Douty | 339/107 |
| 4,130,329 | 12/1978 | Chandler et al. | 339/103 M |
| 4,160,575 | 7/1979 | Schraut | 339/103 M |
| 4,169,648 | 10/1979 | Moist, Jr. | 339/103 R |
| 4,379,606 | 4/1983 | Clark et al. | 339/206 R |
| 4,561,715 | 12/1985 | Sanchez | 339/210 R |

FOREIGN PATENT DOCUMENTS 3046062  6/1982  Fed. Rep. of Germany ... 339/103 M

*Primary Examiner*—John McQuade
*Attorney, Agent, or Firm*—Anthony Potts, Jr.; Robert B. Famiglio; Robert S. Lipton

[57] ABSTRACT

A cover and integral straining relief mechanism for an electrical cable multiprong connector, including a two-piece cover utilizing identical and interconnecting halves assembling as a whole connector, mount, and cover. A strain relief mechanism utilizing a cubical insert is included. The cubical insert is a plunger-like mechanism containing teeth-like undulation along its side which interact in a ratcheting fashion with mating undulations within the connector cover. The plunger is inserted into at least one opening in the connector and comes into contact with a cable entering the connector through the remaining and unused opening. The plunger comes into contact with the insulation about said electrical cable such as to hold the cable securely within the connector, thereby providing strain relief action.

2 Claims, 5 Drawing Figures

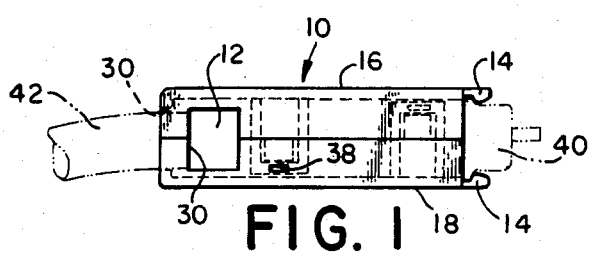
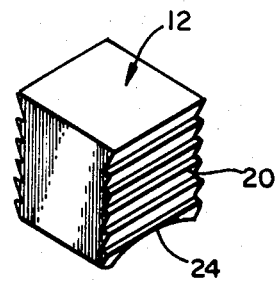
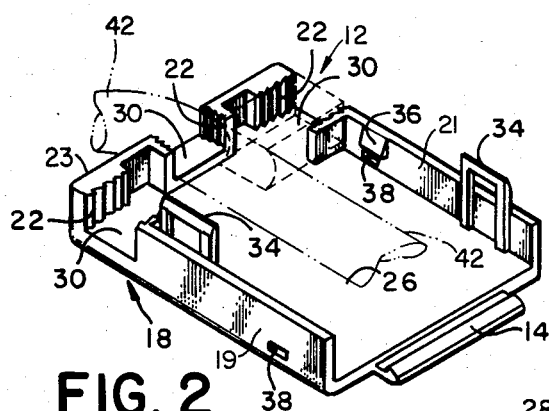
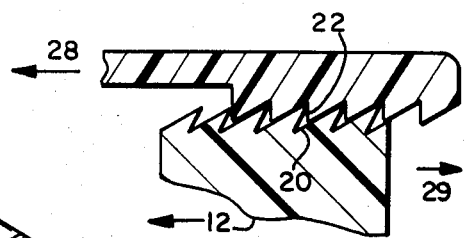
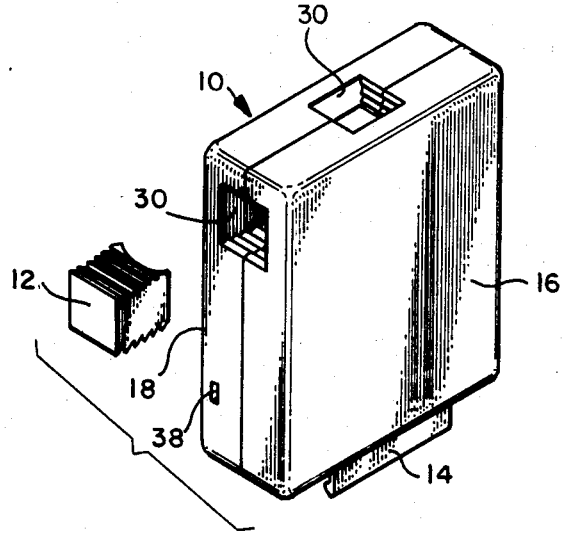

CABLE CONNECTOR COVER WITH INTEGRAL STRAIN RELIEF

This is a continuation of application Ser. No. 584,613, filed Feb. 29, 1984, now U.S. Pat. No. 4,561,715.

BACKGROUND OF THE INVENTION

This invention relates generally to strain relief mechanisms for electrical cable connectors. Specifically, the disclosed invention provides a cover which holds a commonly used multiprong connector for a computer peripheral interconnection whereby a strain relief mechanism for securing the incoming cable utilizes an insert which provides strain relief for the incoming cable by applying pressure against the cable so as to force it securely against the other internal components of the connector.

Heretofore, electrical connectors for use in multiconductor cables, particularly for use in interconnecting computer components and peripherals, utilize a plastic connector housing which assembles around a waffer-like multiprong connector which ultimately is inserted in a mating connector for interconnection of equipment components. The assembly of covers presently in use frequently require utilization of hardware such as screws and bolts, in conjunction with snap connecting clips for assembly. More importantly, strain relief action in securing the cable to the connector cover frequently utilizes friction means whereby the cable entry into the connector provides strain relief to the cable by virtue of its close fit to the connector opening. Alternatively, rubber grommets or U-clamps with associated hardware are utilized to firmly secure the incoming multiconductor cable to the connector housing to provide strain relief and prevent any force acting on the cable from being transmitted through to the individual pins on the actual connector. Not only is such a configuration more costly in the terms of manufacturing several parts, but there is an increased labor cost associated with the additional time required for the assembly of the presently used connectors with their associated hardware and the like.

Further, connectors presently use mirror image halves such as to require manufacturing of two separate components to generally comprise the cover for use about the connector. In the present invention, since no conventional fastening hardware is used, each half of the connector shown is identical to the other half, thereby requiring the manufacture of only one part, any two of which mate to make one entire connector cover.

SUMMARY OF THE INVENTION

In accordance with the present invention, a cable lock connector cover assembly consists of two molded plastic parts which are identical to each other. Further, each half cover contains internal and integrally molded plastic clips which mate with the corresponding clip locks when assembled with an identical half cover, thereby eliminating the requirement for additional hardware.

More specifically, the cable connector cover consists of a generally rectangular box, when assembled, which contains at least two cable exits at one end of the rectangular box, and a connector retaining lip at the opposite end. A commonly used waffer-like multipin connector is inserted between the connector retaining lip when the two halves are assembled to comprise the rectangular box. A multiconductor cable is inserted in one of the said exits such as to allow its passage through the connector cover to the connector itself for attachment thereto. A plunger strain relief mechanism is inserted in the remaining one or two cable exits and makes contact with the incoming cables such as to cause a friction fit. At least one surface of the channel plunger contains teeth-like undulations which mate with the corresponding walls within the cable exits so as to cause a ratcheting fit between the said walls. In this fashion, the plunger is quickly inserted into one of the cable exits until it comes in contact with the incoming cable, therefore causing the cable to be secured firmly. Upon release of the plunger, the ratcheting action of the undulations prevents the plunger from being forced out away from the cable in the opposite direction. The plunger then remains in the position as inserted until the connector is opened for reuse.

Since the plunger strain relief is not permanently attached to the rest of the connector internally, upon reopening of the two connector halves, the plunger so inserted can be released and therefore reused. In this fashion, the invention as disclosed provides an improved strain relief mechanism, a reusable connector cable cover, and a means for assembling the entire connector mechanism with a substantial savings of time and labor.

In the preferred embodiment of the present invention, the two connector halves, identical to each other, are assembled together about the connector with the utilization of the integral plastic clips which mate with the other connector half, so as to hold the two halves together into one rectangular box. Three cable exits are disposed on the three sides of the connector which are opposite the connector retaining lip. The multiconductor cable can exit any one of the three cable exits depending on the direction desired, and the remaining two cable exits are used for the insertion of the plunger strain relief mechanism which firmly secures the multiconductor cable to the body of the cover, thereby preventing transmission of strain through the incoming cable to the connector pins themselves.

It is the object of the present invention to provide an improved strain relief mechanism integrated with a housing and cover for use with a multipin electrical connector.

It is also the object of the present invention to provide an improved strain relief mechanism integrated with a multipin computer connector housing which provides ease of assembly and accelerated assembly time.

It is further the object of the present invention to provide an improved computer peripheral connector housing design which integrates a strain relief mechanism, a housing attachment assembly mechanism, and an integral disassembly mechanism for rapid assembly, disassembly, and reuse of the connector cover and strain relief mechanism.

While the invention will be described in connection with a preferred embodiment, it will be understood that it is not intended to limit the invention to that embodiment. On the contrary, it is intended to cover all alternatives, modifications, and equivalents as may be included within the spirit and scope of the invention as defined by the appended claims.

BRIEF DESCRIPTION OF THE DRAWINGS

Other objects and advantages of the invention will become apparent upon reading the following detailed description and upon reference to the drawings in which like numerals refer to like parts and in which:

FIG. 1 is a side view of the entire connector cover showing the cover in use with a cable entering the cover and a multipin connector in place as in actual use.

FIG. 2 is an exploded view of the entire connector cover showing, in detail, the interior components, undulated ratcheting surfaces for use with the plunger strain relief mechanism, and the internally molded cover latch clips integrated into the cover body.

FIG. 3 is a top view of the assembled cover without a cable in place.

FIG. 4 is a perspective view of the plunger strain relief.

FIG. 5 is a detailed planar view of the interface between the undulated surface of the plunger and connector.

DESCRIPTION OF THE PREFERRED EMBODIMENT

While the present invention is susceptible of embodiments in many different forms, the preferred embodiment and operation thereof is shown in the drawings and the detailed description that follows. It will be understood by those skilled in the art that the present disclosure is to be considered as an exemplification of the principles of the invention and is not intended to limit the invention to the embodiment illustrated. On the contrary, the present invention and disclosure thereof is intended to cover variations in detail which fall within the scope and spirit of the present invention.

FIG. 1 of the drawing shows the connector cover 10 with a cable 42 entering one of the cable exits 30 into the body of the connector ultimately being attached to connector 40. Connector 40 is well known to those skilled in the art as a multipin waffer-like electrical connector commonly utilized in interconnection of various electronic components having conductor connections from two to forty or more connection pins. It will be appreciated that the physical size and length of connector 10 can be varied depending upon the desired use with a particular style of connector 40.

FIG. 2 shows a view of the entire connector cover. Upon review of FIG. 2, it will be appreciated how connector cover 10 is generally made of two major components, upper connector half 16 and bottom connector half 18. Upon inspection, it will be noted that the connector halves 16 and 18 are actually identical to each other in every dimension. The connector halves are rectangular with a connector retaining lip 14 at one end of the rectangle and three walls generally comprising the remaining rectangular shape of the connector half. Side walls 19 and 21 are opposite each other and are disposed at the edge of bottom wall 26, which defines a plane which serves as the shell of the connector half as shown more fully in FIG. 2. Rear wall 23 is disposed at the end of bottom wall 26 which is opposite retaining lip 14 and is adjacent to each of the side walls 19 and 21 as shown in FIG. 2. In the manufacturing process, it is not necessary with the disclosed design to manufacture mirror image connector halves for mating to each other. Since each half unit is identical to every other unit, it is not necessary to distinguish between the top and bottom half, though for clarity they have been individually numbered in the various Figures herein. As can be seen in FIG. 3, the top connector half 16 and bottom connector half 18 are simply pressed together during assembly so as to cause connector retaining lips 14 to firmly grasp the connector waffer 40, which is not shown in FIG. 2 for clarity. Upon doing so, the internally molded cover latch clips 34 anchor with the corresponding cover latch anchors 36 so as to firmly hold the connector halves together as one unit after assembly. It will be appreciated that cover latch clip 34 may be molded as part of the top and bottom connector halves 16 and 18 as part of the molding process during actual manufacture of the connector cover 10. It can be seen from FIG. 2 how the total of four cover latch clips 34 anchor the two connector cover halves firmly together during assembly, there being a total of four cover latch anchors 36 as shown. It will be obvious to those skilled in the art that each connector half 16 and 18 may be made utilizing plastic molding processes so that clip 34 and anchors 36 may be an integral part of the connector half 16 and 18.

The molding of cover latch clips 34 in the interior of the connector halve 16 and 18 allows for a connector cover assembly which has no external latches exposed which might be damaged or inadvertently released during use and operation of the cover in conjunction with a connector 40. It can be appreciated that utilizing the cover latch clip 34 and anchors 36, no additional hardware such as screws or bolt are required for completion of assembly. The walls of connector halves 16 and 18 contains a latch release access hole 38, as more clearly shown on FIG. 3 of the drawings. Through the access hole 38 a small instrument, such as a screwdriver, may be inserted therein to release clip 34 so that the two halves 16 and 18 may be released as to allow the connector cover to again be separated into two halves, thereby allowing reuse of the cover or repair of the connections between cable 42 and connector 40.

Turning to FIG. 2, the unique strain relief mechanism will now be described. It will be appreciated by those skilled in the art that the interface between an electrical cable and a connector cover or mechanism usually provides for a strain relief device to prevent transmission of any strain placed on the conductor from being transmitted to the actual interface of the conductor to the connector component itself. Such is usually the function of a peripheral component placed on a connector cover. Normally, a rubber grommet or a U shaped compression clamp is employed in the area of a connector cover which provides for the entry or exit of a conductor. Generally, this clamp or grommet applies compression about the jacket of the cable such as to firmly fix the exiting point on the connector cover.

In the present invention, strain relief of the exiting cable 42 is provided through the application of normal force between plunger 12 and the connector cover 10. FIG. 4 shows a detailed view of plunger 12 which, for the purpose of the present description, consists generally of a cubic component which contains at least one surface 20 which is comprised of teeth-like undulations. Without any change or alteration in the operation of the present invention, it will be appreciated that plunger 12 may be cylindrical in design, as an alternative to the cubical shape illustrated. A cylindrical designed plunger 12 would then mate with cylindrical shaped cable exit 30. The geometric shape or dimension of plunger 12 is not confined to the shape or dimension illustrated in the present application in that the same results may be obtained using variations. The only constraint with respect to the design of plunger 12 and exit 30 is that the mating undulated surfaces 20 and 22 are designed to function together as below described. In the preferred embodiment, the plunger 12 contains two surfaces on opposite sides of the plunger 12 so as to provide for firmer and more reliable ratcheting action, as will be described below. Plunger 12 further has a concave surface 24 which is the surface of plunger 12 which makes contact with conductor 42, as will be explained. The purpose of the concave surface 24 is to provide for an even force transmission from plunger 12 to the generally cylindrical design of most electrical conductors contemplated for use with the present invention.

Turning to FIG. 5 of the drawings, the ratcheting action of plunger 20 in cable exits 30 will now be described. It will be appreciated by those skilled in the art that the formation of the surface undulations on plunger 12 which comprise plunger teeth 20 can be made during the manufacture of plunger 20. It is contemplated in the preferred embodiment that plunger 20 is a plastic design, such as the entire connector cover 10, so that teeth 20 on plunger 12 will yield under plastic deformation a minor amount sufficient to allow insertion in exits 30 even though channel teeth 22 extend into the path of teeth 20. By using a sawtooth-like design, teeth 20 will deform slightly when in contact with teeth 22 when plunger 12 is inserted in one of the cable exits 30 in direction 28, as shown in FIG. 5. Direction 28 is towards the interior of connector 10, which would be the direction of insertion during the assembly of connector 10.

Once plunger 12 is inserted such as to come in contact with cable 42, the force generated between plunger 12 and cable 42 would normally cause plunger 12 to be forced in an opposite direction, being shown at 29 in FIG. 5. However, due to the ratcheting effect experienced between teeth 20 and teeth 22, the said surfaces do not easily deform in the reverse direction, causing plunger 12 to be secure in its farthest insertion location. It is not possible to remove plunger 12 after insertion in the fashion so described due to the unidirectional characteristics of surface 22 and 20.

The details and design philosophy of the channel teeth 22 and the plunger teeth 20 are well known to those skilled in the art, and such ratcheting-like action between such surfaces have been utilized in unidirectional cable straps and other strap buckle operations, which are also well known to those skilled in the art. It will be appreciated that upon the release of cover latch clip 34, by utilization of a tool inserted into access hole 38 as above described, connector half 16 and half 18 will separate from each other, allowing plunger 12 to thereby be removed by moving it in a direction normal to its direction of entry. Movement in this directions is provided for as teeth 20 on plunger 12 move in a direction parallel to the corresponding teeth 22 in the channel wall. In this operation, it can be appreciated that the entire connector 10 can be utilized and reused an unlimited number of times without the requisite assembly and disassemble associated with conventional fixed hardware such as screws and nuts, in addition to the permanency usually indicated with more conventional strain relief mechanisms such as U-clamps and crimp connectors.

Although the process for this invention has been described with reference to a particular embodiment thereof, it should be understood that those skilled in the art may make other modifications and embodiments thereof which will fall within the spirit and scope of the principles of this invention as defined by the appended claims.

What is claimed is:

1. An electrical connector cover comprising:
   (a) two generally rectangularly half covers each comprised of a bottom wall, a first side wall, a second side wall, and one rear wall;
   (b) a connector retaining lip disposed on the edge of the bottom wall opposite the rear wall;
   (c) an opening means through at least two of said walls, said opening means containing undulations therein and along an internal wall of an exit;
   (d) a plunger containing at least one surface having undulations thereon for ratcheting with said undulations within said opening means; and
   (e) wherein said half covers are fitted together with said bottom wall, first side wall, second side wall, and rear wall of each half cover defining an internal volume within said connector cover; and
   (f) wherein an electrical conductor enters said internal volume through one of said opening means and passes through the internal volume to said connector retaining lip; and
   (g) wherein further said plunger is inserted into another of said opening means to contact said conductor and exert a force on said conductor at the point of contact between said conductor and said plunger.

2. The cover of claim 1 wherein said half covers are fixed together with integrated connecting latches disposed at points diametrically opposite to each other on said first and second side walls such as to affix said half covers together, wherein further said latches may be engaged and then disengaged such that said half covers are disconnected from each other.

* * * * *